Dec. 16, 1969   R. A. GILBERT ETAL   3,483,696
POWER PLANT FOR A HELICOPTER
Filed March 25, 1968   2 Sheets-Sheet 1
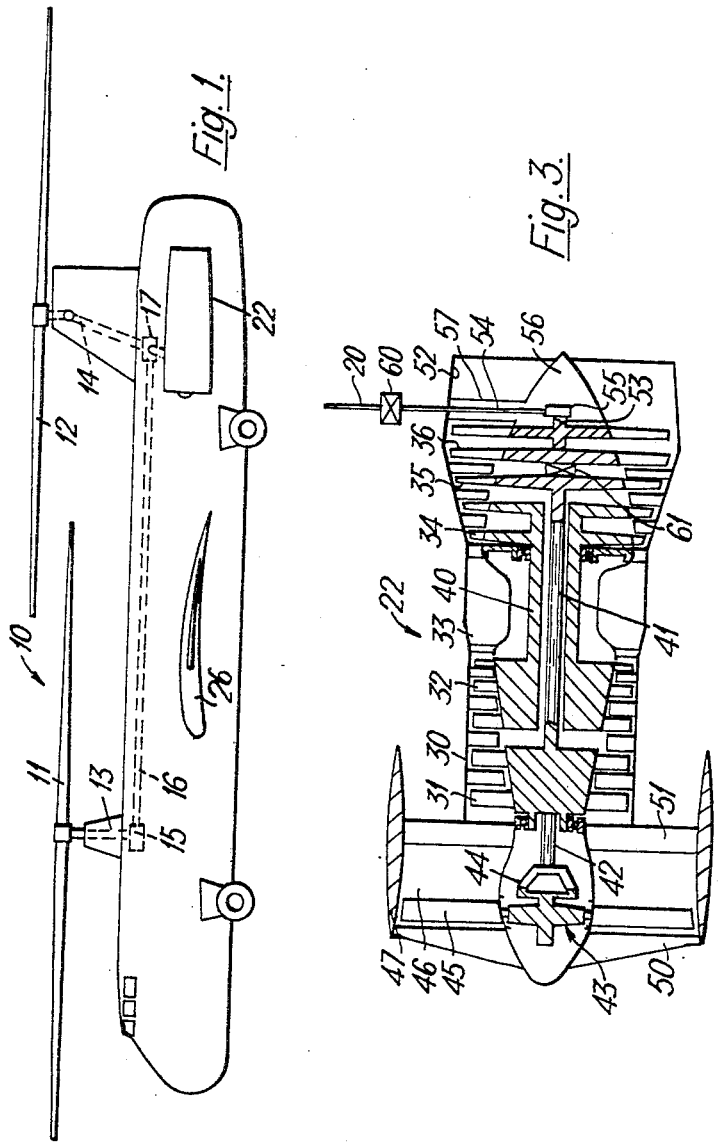
Inventors
Ronald Albert Gilbert
Ralph John Shire
By
Cushman, Darby, Cushman
Attorneys Dec. 16, 1969    R. A. GILBERT ET AL    3,483,696
POWER PLANT FOR A HELICOPTER
Filed March 25, 1968                    2 Sheets-Sheet 2
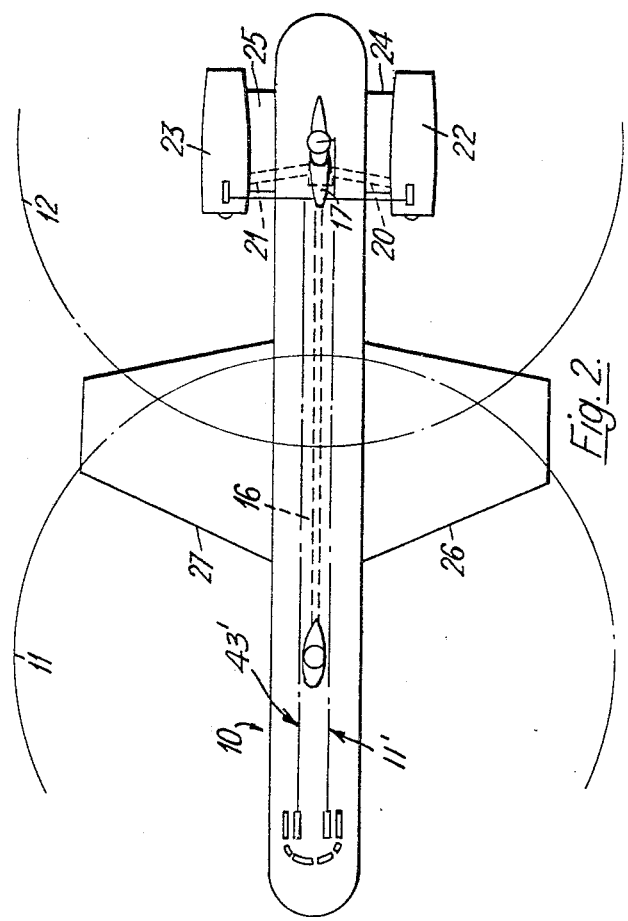

3,483,696
POWER PLANT FOR A HELICOPTER
Ronald Albert Gilbert, Allestree, Derby, and Ralph John Shire, Normanton, Derby, England, assignors to Rolls-Royce Limited, Derby, England, a British company
Filed Mar. 25, 1968, Ser. No. 715,787
Claims priority, application Great Britain, Apr. 20, 1967, 18,300/67
Int. Cl. F02c 1/06, 7/02; F02k 3/02
U.S. Cl. 60—39.16
12 Claims

ABSTRACT OF THE DISCLOSURE

A power plant for a helicopter comprises a gas turbine engine having a free turbine, a shaft drivingly connected to a fan, mechanical drive means for mechanically rotating a helicopter rotor, and speed-sensitive clutch means for transmitting drive from the free turbine selectively either to the said mechanical drive means or to the said shaft in dependence upon whether the rotational speed of the free turbine is respectively below or above a predetermined value.

---

This invention concerns a power plant for a helicopter, and a helicopter provided therewith.

According to the present invention, there is provided a power plant for a helicopter comprising a gas turbine engine having a free turbine, a shaft drivingly connected to a fan, mechanical drive means for mechanically rotating a helicopter rotor, and speed-sensitive clutch means for transmitting drive from the free turbine selectively either to said mechanical drive means or to the said shaft in dependence upon whether the rotational speed of the free turbine is respectively below or above a predetermined value.

The term "fan" where used in this specification is intended to include all air impellers including propellers.

The said speed-sensitive clutch means may comprise first and second speed-sensitive unidirectional clutches, the first speed-sensitive unidirectional clutch being arranged to interconnect the free turbine and the mechanical drive means, and the second speed-sensitive clutch being arranged to interconnect the free turbine and the said shaft, the first speed-sensitive unidirectional clutch being respectively engaged and disengaged when the rotational speed of the free turbine is respectively below and above the said predetermined value, and the second speed-sensitive unidirectional clutch being respectively engaged and disengaged when the rotational speed of the free turbine is respectively above and below the said predetermined value.

The said shaft may have a compressor and a turbine (e.g. a low pressure compressor and a low pressure turbine) mounted thereon.

The said shaft is preferably drivingly connected to the fan by way of a reduction gear.

Means are preferably provided for varying the pitch of the fan blades thereby to vary the power absorbed by the fan.

The fan is preferably disposed within a duct. Moreover, some of the air passing through the said duct may be supplied to the intake of the said compressor, the remainder of the said air by-passing the said gas turbine engine. The by-pass ratio is preferably at least 3:1 and, in a preferred embodiment, is between 4:1 and 5:1.

The invention also comprises a helicopter provided with at least one power plant as set forth above, the mechanical drive means of the or each power plant driving at least one helicopter rotor provided with means for varying the pitch of its blades.

Thus the helicopter may have two helicopter rotors which are drivingly interconnected to each other and are driven by two said power plants, the arrangement being such that if one of the power plants fails the other power plan is capable of driving both helicopter rotors to permit the helicopter to remain hovering.

The helicopter is preferably provided with aerofoil surfaces which are adapted to provide aerodynamic lift for the helicopter under forward flight.

The invention is illustrated, merely by way of example in the accompanying drawings, in which:

FIGURE 1 is an elevation of a helicopter provided with two power plants in accordance with the present invention, FIGURE 2 is a plan of the helicopter shown in FIGURE 1, and FIGURE 3 is a sectional view of one of the power plants employed in the helicopter shown in FIGURES 1 and 2.

Referring to the drawings, a helicopter 10 is provided with two rotors 11, 12, which are mechanically rotated by shafts 13, 14 respectively. Means diagrammatically shown at 11' are provided for varying the pitch of the blades of each of the rotors 11, 12. The shaft 13 is driven through a gear box 15 by a shaft 16. The shafts 14 and 16 are interconnected to each other by virtue of being driven from a common differential drive unit 17, the drive to the differential drive unit 17 being supplied by shafts 20, 21. It will now be apparent that the two gas turbine engines 22 and 23 drive the shafts 14 and 16 through the differential drive unit 17 and should one of the engines fail, then the other engine will provide the proper drive to both rotors 11 and 12 through the shafts 14 and 16, assuming the good engine has its speed appropriately increased.

The shafts 20, 21 are respectively driven by power plants comprising two gas turbine engines 22, 23 which are respectively mounted on stub wings 24, 25 of the helicopter 10. Further wings 26, 27 are mounted on the helicopter 10 for providing aerodynamic lift in forward flight.

The engines 22, 23 are identical in construction, the engine 22 being shown in detail in FIGURE 3.

The engine 22 has a casing 30 within which there are mounted in flow series a low pressure compressor 31, a high pressure compressor 32, combustion equipment 33, a high pressure turbine 34, a low pressure turbine 35 and a two-stage free turbine 36.

The high pressure turbine 34 drives the high pressure compressor 32 by way of a shaft 40. Mounted concentrically within and extending through the shaft 40 is a shaft 41 which is driven by the low pressure turbine 35 and which drives the low pressure compressor 31.

The shaft 41, on the upstream side of the low pressure compressor 31, has an extension 42 which drives a front ducted fan 43 by way of a reduction gear 44 (which may, for example, have a ratio of about 4:1). The front ducted fan 43 has variable pitch blades 45 which are mounted in a fan duct 46 which is provided inwardly of a shroud 47, the shroud 47 being supported from the engine by way of struts 50, 51.

Means diagrammatically shown at 43' are provided for varying the pitch of the fan blades 45, thereby to vary the power absorbed by the ducted fan 43.

The fan blades may have a tip speed of 1400 ft. per second, and may be made of fibre reinforced synthetic resin material.

Air entering the engine 22 passes through the ducted fan 43, most of this air (and preferably at least two-thirds thereof) by-passing the engine 22 and passing direct to atmosphere. A part, however, of the air from the ducted fan 43 (e.g. one fifth or one quarter) passes through the compressors 31, 32, combustion equipment 33, turbines 34 and 35, and free turbine 36, and thence through a jet pipe 52 to atmosphere.

The free turbine 36 is mounted on a shaft 53 and drives a shaft 54 through a gear box 55, the gear box 55 being mounted in a tail cone 56 at the downstream end of the engine 22. The shaft 54 extends through a hollow strut 57 which extends between the tail cone 56 and the casing 30.

The shaft 54 is drivingly connected to the shaft 20 by way of a speed-sensitive uni-directional clutch 60.

The shaft 53 is also drivingly connected through a speed-sensitive uni-directional clutch 61 to the shaft 41.

The clutches 60, 61 are well known per se, and may for example be constituted by Legge couplings. The clutch 60 is arranged to be respectively engaged and disengaged when the rotational speed of the free turbine 36 is respectively below and above a predetermined value, while the clutch 61 is arranged to be respectively engaged and dis-engaged when the rotational speed of the free turbine 36 is respectively above and below the said predetermined value.

Thus, the clutches 60, 61 constitute a means for selectively transmitting drive from the free turbine 36 either to the shaft 20 or to the shaft 41 in dependence upon whether the rotational speed of the free turbine 36 is respectively below or above the said predetermined value.

In operation, each of the engines 22, 23 may be started by means of a starter motor (not shown) to effect starting of the high pressure turbine 34 and its associated high pressure compressor 32. Moreover, if necessary, a starter motor could be provided for effecting starting of the low pressure turbine 35 and its associated low pressure compressor 31. At this stage, the fan 43 would not absorb any significant power, since its blades 45 would be set at zero pitch. The rotors 11, 12 would also at this stage be prevented from rotating by means of brakes (not shown).

When it is required to lift off, the said brakes are released, pitch is applied to the blades of the rotors 11, 12, and the rotational speeds of each of the engines 22, 23 is increased. The speed of each free turbine 36 at this time, by reason of the power absorbed by the rotors 11, 12, will be below the said predetermined value, so that the clutch 60 will be engaged and the clutch 61 disengaged, whereby the free turbines 36 will drive the rotors 11, 12. As the power of the engines 22, 23 is increased, the pitch of the rotors 11, 12 is also increased, and although the fan 43 will rotate, it will at this time only be in fine pitch. The helicopter 10 will therefore now lift to the specified altitude by means of the rotors 11, 12.

When the specified altitude has been reached, the pitch of the blades of the rotors 11, 12 is reduced, while that of the blades 45 of the fan 43 is increased. This will cause the rotational speed of the shaft 20 to increase (since the power absorbed by the rotors 11, 12 is reduced), and hence allow the rotational speed of the free turbine 36 to increase. As a result, the clutch 60 will become disengaged, and the clutch 61 will become engaged, so that the power of the free turbine 36 will be transmitted to assist in driving the fan 43. When this has occurred, the rotors 11, 12 will merely auto-rotate.

In forward flight, the necessary aero-dynamic lift is provided by the wings 26, 27 and by the auto-rotation of the rotors, and forward propulsion is provided by the fans 43 and also by the jet gases from the engines 22, 23.

Descent of the helicopter is effected in a reverse manner to the take-off procedure described above.

If the engines 22, 23 are designed to provide, say 160% more power than that required in hover conditions, such that speeds of the order of 250 miles per hour may be achieved, then a particularly safe helicopter will be provided, since the helicopter will still be able to hover even if one of its two engines has failed, the speed of the good engine being appropriately increased.

Since the rotors 11, 12 are mechanically driven from the engines 22, 23, no air ducts are required in the rotor blades to feed tip jets, as would be required for purely jet propelled rotors, and thus the "thickness/chord" ratio of the outer sections of the blades may be kept very low, thereby to reduce drag. Again, by using mechanically driven rotors 11, 12, the noise of the helicopter 10 can be kept low, since the noise of "tip jet" is eliminated.

We claim:

1. Power plant for a helicopter having a rotor and comprising a gas turbine engine having a free turbine, a shaft, a fan drivingly connected to the shaft, mechanical drive means for mechanically rotating the helicopter rotor, and speed-sensitive clutch means to transmit drive from the free turbine selectively to the said mechanical drive means when the rotational speed of the free turbine is below a predetermined value and to the said shaft when the rotational speed of the free turbine is above the predetermined value.

2. Power plant as claimed in claim 1 in which the said speed-sensitive clutch means comprise first and second speed-sensitive uni-directional clutches, the first speed-sensitive uni-directional clutch comprising means to interconnect the free turbine and the mechanical drive means, and the second speed-sensitive clutch comprising means interconnect the free turbine and the said shaft, the first speed sensitive uni-directional clutch being respectively engaged and disengaged when the rotational speed of the free turbine is respectively below and above the said predetermined value, and the second-sensitive uni-directional clutch being respectively engaged and disengaged when the rotational speed of the free turbine is respectively above and below the said predetermined value.

3. Power plant as claimed in claim 1 in which the said shaft has a compressor and a turbine mounted thereon.

4. Power plant as claimed in claim 3 in which the said compressor is a low pressure compressor and the said turbine is a low pressure turbine.

5. Power plant as claimed in claim 1 in which a reduction gear drivingly connects the said shaft to the fan.

6. Power plant as claimed in claim 1 wherein the fan has variable pitch blades.

7. Power plant as claimed in claim 1 comprising a duct within which the fan is disposed.

8. Power plant as claimed in claim 3 comprising a duct within which the fan is disposed, means supplying some of the air passing through the said duct to the intake of the said compressor, the remainder of the said air by-passing the said gas turbine engine.

9. Power plant as claimed in claim 8 in which the by-pass ratio is at least 3:1.

10. A helicopter provided with at least one power plant as claimed in claim 1, the mechanical drive means of the at least one power plant driving at least one helicopter rotor.

11. A helicopter as claimed in claim 10 in which there are two helicopter rotors driven by two said power plants and comprising means to drivingly interconnect hte rotors, one power plant driving both rotors if the other power plant fails.

12. A helicopter as claimed in claim 10 in which the helicopter is provided with lift-producing aerofoil surfaces to provide aerodynamic lift for the helicopter under forward flight.

References Cited

UNITED STATES PATENTS

| | | | |
|---|---|---|---|
| 2,552,864 | 5/1951 | Piasecki | 170—135.75 XR |
| 2,715,506 | 8/1955 | Peterson | 244—7 |
| 3,368,778 | 2/1968 | Wilde et al. | 244—6 |
| 3,375,996 | 4/1968 | Wilde | 244—7 |
| 3,375,997 | 4/1968 | Gist | 244—6 XR |
| 3,423,048 | 1/1969 | Clarke et al. | 244—7 |

MARK NEWMAN, Primary Examiner

A. D. HERRMANN, Assistant Examiner

U.S. Cl. X.R.

60—226; 170—135.75; 244—7, 17.11